United States Patent [19]

Schoenmakers

[11] Patent Number: 4,485,420
[45] Date of Patent: Nov. 27, 1984

[54] MAGNETIC-TAPE CASSETTE APPARATUS HAVING VERY LOW AZIMUTH ERROR

[75] Inventor: Johannes J. M. Schoenmakers, Eindhoven, Netherlands

[73] Assignee: U.S. Philips Corporation, New York, N.Y.

[21] Appl. No.: 367,314

[22] Filed: Apr. 12, 1982

[30] Foreign Application Priority Data

Apr. 13, 1981 [NL] Netherlands .......................... 8101795
Jan. 19, 1982 [NL] Netherlands .......................... 8200175

[51] Int. Cl.³ .......................... G11B 15/60; G11B 5/10
[52] U.S. Cl. .................................. 360/130.21; 360/109
[58] Field of Search ............ 360/109, 104, 106, 130.2, 360/130.21; 242/199

[56] References Cited

U.S. PATENT DOCUMENTS 3,882,543  5/1975  Richards ............................. 360/109
3,893,188  7/1975  Shoemaker ................ 360/130.21 X

FOREIGN PATENT DOCUMENTS

1124253  2/1962  Fed. Rep. of Germany ......................... 360/130.21
1772656  5/1971  Fed. Rep. of Germany ......................... 360/130.21
54-2709   1/1979  Japan ............................... 360/130.21
56-137512 10/1981 Japan ............................... 360/130.21

Primary Examiner—John H. Wolff
Attorney, Agent, or Firm—David R. Treacy

[57] ABSTRACT

A magnetic-tape cassette apparatus includes a magnetic head unit having a magnetic head with a head face and head gap defining a head gap plane. To each side of the head face, in the direction of tape transport, a tape guide is provided adjacent the head face and having a radius of curvature smaller than that of the head face. At one end of each tape guide a height limiter is arranged, having a limit surface facing the tape such that a line connecting the limit surfaces is perfectly perpendicular to the head gap plane. The apparatus includes a control member or surface for keeping a lateral edge of the tape constantly in contact with the limit surfaces during tape transport.

26 Claims, 33 Drawing Figures

MAGNETIC-TAPE CASSETTE APPARATUS HAVING VERY LOW AZIMUTH ERROR

BACKGROUND OF THE INVENTION

The invention relates to a magnetic-tape cassette apparatus, which comprises a magnetic head unit equipped with a magnetic head having a head face in which a head gap terminates, along which head face a magnetic tape is passed. The magnetic head unit carries height limiters disposed on opposite sides of the head gap in the direction of transport of the magnetic tape, for limiting movement of the magnetic tape in at least one direction.

In magnetic-tape casset apparatuses of this kind the tape path is partly defined by elements on the apparatus and partly by tape guides arranged in the magnetic-tape cassette. These tape guides, which are generally mass-manufactured from a plastic material, are subject to fairly large tolerances. In practice it is mainly these tolerances which give rise to so-called azimuth errors in magnetic-tape cassette apparatuses; that is, errors which occur because the head-gap position deviates from a purely perpendicular position to the longitudinal edge of the magnetic tape. For example, during stereo reproduction a deviation of 20 minutes may give rise to a loss of 10 dB at a frequency of 10 kHz. This is particularly undesirable when pre-recorded magnetic-tape cassettes, so-called music cassettes, are played back.

In order to solve this problem is has been proposed to utilize control systems which, for example by means of piezo-electric elements, constantly influence the lace-up so as to cancel any azimuth errors. Such control systems cause the cassette apparatus to be very expensive and in fact do not provide a satisfactory general solution.

SUMMARY OF THE INVENTION

It is an object of the invention to provide a magnetic-tape cassette apparatus in which the magnetic head unit is passively capable of effectively eliminating the most frequency occuring azimuth errors.

According to the invention the magnetic head carries tape guides on opposite sides of the head gap relative to the direction of transport of the magnetic tape, which tape guides have a smaller radius than the head face and are arranged in such a way relative to the head face that at the location of each tape guide the magnetic tape locally contacts the tape guide. At one end each tape guide joins a height limiter, the two height limiters being arranged in such a way relative to the magnetic head that a connecting line between limit surfaces on the height limiters extends purely perpendicularly to a plane through the head gap. The apparatus further comprises control means for constantly keeping a lateral edge of the magnetic tape in contact with each limit surface during tape transport.

In the magnetic-tape cassette apparatus in accordance with the invention azimuth errors can be reduced to such a low level that they are no longer annoying. It has been found that a reduction to an error or less than 4 minutes is attainable. If during manufacture of the head unit care is taken that the connecting line between the limit surfaces extends purely perpendicularly to the head gap a head unit with an inherently correct azimuth position is obtained. The advantage of this is that during manufacture of the apparatus no further adjustment of the head unit is required. Moreover, this has the advantage that in the case of subsequent replacement of the head unit no azimuth adjustment is required, which may render such a repair substantially cheaper. Moreover, the presence of the height limiters may provide a stable tape movement along the magnetic head in the apparatus in accordance with the invention, so that a satisfactory tape-to-head contact is obtained.

The apparatus in accordance with the invention is particularly suitable for recording and/or playing back cassettes in which digital information is recorded in a multitude of narrow parallel tracks, in that the height limiters accurately maintain the height position of the tracks.

It is to be noted that the thin sheet-steel lugs which are generally provided on the magnetic heads of cassette equipment only serve for optimizing the height position of the tracks on the magnetic tape. In principle such lugs are not suitable for correcting an incorrect azimuth position of a magnetic tape which is moved along a magnetic head; this is bound to give rise to curling and/or damaging of the tape edge as a result of the high pressure exerted by the very thin lugs on the edge which is at least locally comparatively slack.

In a preferred embodiment of the magnetic-tape cassette apparatus in accordance with the invention the tape guides comprise cylindrical bodies disposed near the head face, whose axes extend parallel to the cylinder axis of the head face. These bodies project from the adjacent parts of the head face in order to obtain a satisfactory contact with the magnetic tape. By means of these tape guides it is ensured that at the loacation of the height limiters the magnetic tape is taut, thereby precluding curling of the lateral edge of the magnetic tape as a result of the contact with the height limiters. Moreover, the location of the tape guides is essential for an accurate tape movement along the magnetic head.

In a further embodiment of the magnetic-tape cassette apparatus in accordance with the invention the cylindrical bodies are integral with the part of the magnetic head comprising the head face and are preferably positioned accurately relative to a reference face of the magnetic head by means of a grinding operations. Thus, by for example one continuous grinding operation, it is possible to obtain an accurately formed magnetic head unit suitable for use in an apparatus in accordance with the invention. This also provides the possibility of forming the tape guides by means of computor control, for which purpose the magnetic heads comprise a reference face.

In a further embodiment of an apparatus in accordance with the invention at least one height limiter is formed by a guide element which is axially adjustable adjusted relative to the associated cylindrical body. In this way it is possible to ensure that the connecting line between the two height limiters extends purely perpendicularly to the head gap by adjusting the guide element.

A further preferred embodiment of an apparatus in accordance with the invention is characterized in that the height limiters comprise projecting lugs of a plate-shaped body which is arranged on a major surface of the magnetic head, which surface extends substantially parallel to the direction of tape transport. As a result of this the height limiters can simply be connected to the magnetic head.

In an advantageous aspect of this embodiment the plate-shaped body comprises a mounting plate on which the magnetic head is arranged. In this way the plate-shaped body has a double function. On the one hand it forms the height limiters and on the other hand it serves for mounting the magnetic head on the apparatus.

In yet another preferred aspect of the embodiment just described the limiter element is the end portion of a lug cut out of the mounting plate, which lug is pivotable relative to the remainder of the mounting plate in order to provide axial adjustment. This yields a simple axial adjustment of the height limiters, enabling the head gap to be adjusted to a position which is perfectly perpendicular to the connecting line in a simple yet accurate manner.

It is further of advantage if the magnetic head unit comprises a plurality of pins at the side facing the apparatus, by means of which pins the magnetic head unit is plugged onto the apparatus and is also electrically connected to the apparatus. In this way mounting the magnetic head unit has become a very simple operation both during assembly and during repair.

A magnetic head unit adapted for use in an apparatus in accordance with the invention is preferably characterized in that the control means for constantly keeping the lateral edge of the magnetic tape in contact with the height limiters comprises two flat springs which are each situated above an associated tape guide, the axial dimension of each tape guide, measured from the height limiter to the flat spring, not exceeding the minimum width dimension of the magnetic tape. The advantage of this construction is that all provisions which ensure a stable and accurate tape transport along the magnetic head are incorporated in the magnetic head unit itself. This makes it possible to retrofit equipment not provided with a magnetic head unit in accordance with the invention which such a magnetic head unit.

In view of this further embodiment of a magnetic head unit in accordance with the invention is characterized in that the magnetic head unit comprises lateral members disposed on opposite sides of the head face in the direction of transport of the magnetic tape, end portions of these members forming the cylindrical bodies, while the flat springs extend along the upper surfaces of the lateral members and the height limiters are disposed underneath the lateral members, the overall height, measured from the upper surfaces of the flat springs to the limit surface on the underside of the height limiters being at the most equal to the height of the front surface of the magnetic head. The advantage of this is that the magnetic head unit has such a height dimension that it may readily be used in cassettes of standard dimensions, such as Compact Cassettes. As a result of this the magnetic head unit in accordance with the invention is suitable for use in conjunction with magnetic-tape cassette equipment intended for use with Compact Cassettes.

It is of advantage if the height limiters comprise hardened metal blocks which are arranged against the underside of the lateral members. In this way the lateral members and consequently the tape guides themselves can be made of an easy-to-manufacture material, such as a plastic. Moreover, the height limiters can be made of a suitable material which is resistant to the abrasive action of the tape edge.

A further preferred embodiment of a magnetic head unit in accordance with the invention is characterized in that on the mounting plate between the lateral members there is arranged knife-edge bearing for a pivoting of the magnetic head about an axis perpendicular to the direction of transport of the magnetic tape. This has the advantage that the magnetic head unit may be equipped with a standard commercially available magnetic head, which does not necessitate the use of a special magnetic head with an adapted casing. This is particularly favorable if the magnetic head unit in accordance with the invention is to be manufactured in comparatively small quantities.

Embodiments of the invention will now be described in more detail, by way of example, with reference to the drawing.

DESCRIPTION OF THE PREFERRED EMBODIMENTS

Figure 1:
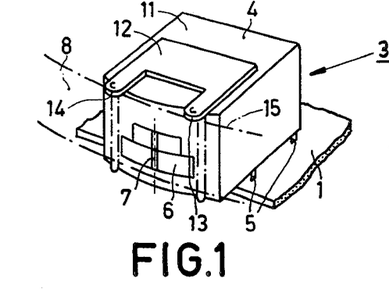
FIG. 1 is a perspective view of a part of an apparatus in accordance with the invention.
Figure 2:
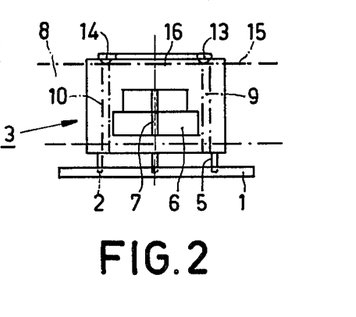
FIG. 2 is a different view of the part of the apparatus shown in FIG. 1.

The magnetic-tape cassette apparatus shown in FIG. 1 is intended for use in conjunction with the magnetic tapes contained in cassettes. Such a cassette may be, for example, of the compact cassette type. The apparatus comprises a head-mounting plate 1, in which a number of electrical connection sockets 2 are present. The magnetic head unit 3 with the magnetic head 4 comprises five pins 5 facing the head-mounting plate 1, by means of which the magnetic head unit is plugged onto the head-mounting plate 1 and by means of which the magnetic head unit is also electrically connected to the apparatus. One side of the magnetic head 4 comprises a head face 6, in which a head gap 7 terminates. A magnetic tape 8 is passed along the head face 6 for recording and/or reproducing signals on the magnetic tape. By means of a grinding operation tape guides 9 and 10 are formed in both sides of the head face 6 of the magnetic head, which tape guides are integral with the part of the magnetic head comprising the head face, which have a smaller radius than the head face, and are preferably formed by accurately carrying out the grinding operation relative to a reference face of the magnetic head unit. This reference face may, for example, be a major surface such as the upper surface 11 of the magnetic head. By means of computer control during manufacture of the magnetic head the upper surface 11 can be positioned accurately relative to the head gap 7 and relative to the direction of tape transport. Suitably, the tape guides 9 and 10 comprise cylindrical bodies which form part of the head and whose axes extend perfectly parallel to the cylinder axis of the head face 6. On the upper surface 11 a plate-shaped body 12 is arranged, for example by gluing or welding. By accurately positioning the upper surface 11 the plate-shaped body 12 is also positioned accurately relative to the head gap 7. The plate-shaped body 12 comprises two lugs 13 and 14 which project from the magnetic head and which are slightly bent as indicated in FIG. 2. The lugs 13 and 14 constitute guide elements and height limiters for a lateral edge 15 of the magnetic tape 8. By the accurate positioning of the upper surface 11 and hence of the plate-shaped body 12 it is achieved that the connecting line 16 between underneath or limit surfaces of the lugs 13 and 14 is perfectly perpendicular to a plane through the head gap 7. In order to ensure that the lateral edge 15 of the magnetic tape is constantly in contact with the lugs 13 and 14 suitable control means may be provided on the apparatus. For this purpose various possibilities exist, which in general comprises all control means which give the tape a tendency to move upwards. These control means may form part of the head unit or of other parts of the apparatus. One of the possibilities is to give the magnetic head 4 a slightly backward tilt. Another possibility is to arranged the head slightly lower, for example half a millimeter, relative to other tape guides on an erase head of the apparatus or of the cassette. However, in that case care must be taken that the lateral edge of the tape does not curl. Moreover, this method imposes stringent requirements on the resistance to wear of the lugs 13 and 14. A further possibility is to arrange the capstan of the apparatus, which provides the tape transport along the magnetic head, in a slightly tilted position. This may already be achieved by, for example, giving the capstan a tilt of 10 minutes. Obviously, when a plate-shaped body is arranged underneath the magnetic head 4, the relevant means should comply with the opposite requirement, namely that they tend to move the tape 8 downwards. As a result of the bent shape of the lugs 13 and 14 the contact of the tape with the lugs is minimal, so that a comparatively low wear occurs. The presence of the height limiters comprising the lugs 13 and 14 and the accurate positioning of the tape guides 9 and 10 result in a very stable movement of the tape along the magnetic head. This is of great advantage for a current contact of the magnetic tape with the magnetic heads.

By very accurately manufacturing the magnetic head unit 3 by means of computer equipment the azimuth position of the magnetic head 4 can be defined very accurately by magnetic head unit. As a result of this the connecting line 16 will have the correct perpendicular position relative to the head gap 7, so that during manufacture of the apparatus no further adjustments are necessary. Moreover, this ensures that further tape guides of the apparatus or of a magnetic-tape cassette used in conjunction with the apparatus do not influence the movement of the tape along the magnetic head 4. As regards the azimuth position, this tape movement is solely determined by the position of the lugs 13 and 14. This is especially of advantage when prerecorded cassettes are used, so-called music cassettes, in which the positioning of the tape guides in the cassette is generally subject to fairly large tolerances.

The magnetic head unit described in the foregoing further has the advantage that if after prolonged use of the apparatus the magnetic head is to be replaced the magnetic head unit can simply be replaced without any expensive adjustments. It suffices to insert the pins 5 into the sockets 2.

Figures 3, 4, 5:
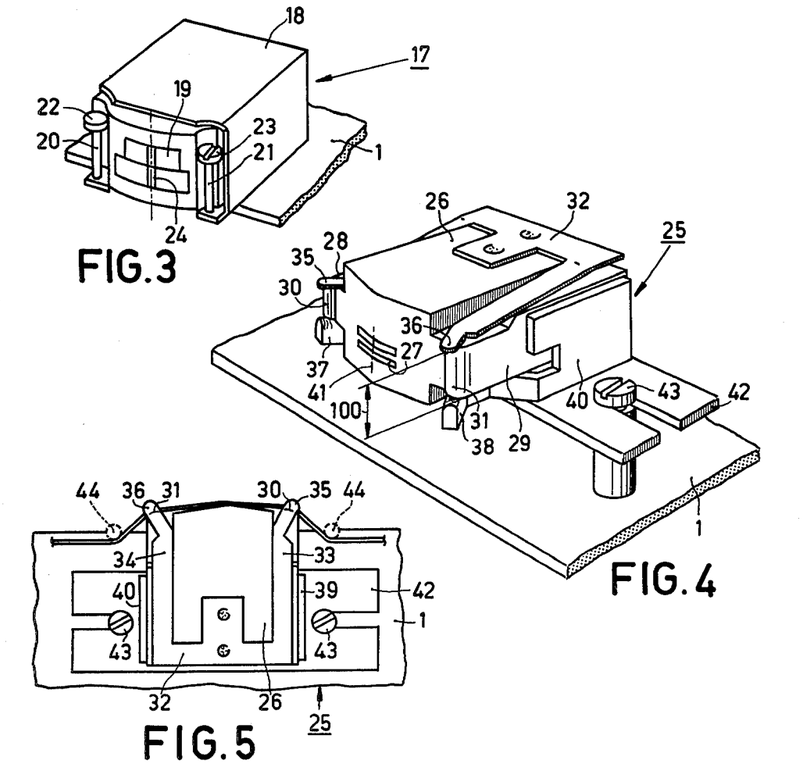
FIG. 3 shows a part of a second embodiment of an apparatus in accordance with the invention.
FIG. 4 shows a part of a third embodiment of an apparatus in accordance with the invention.
FIG. 5 is a plan view of the part of the apparatus shown in FIG. 4.

FIG. 3 shows a second embodiment of an apparatus in accordance with the invention, in which a magnetic head unit 7 is plugged onto a head mounting plate 1 in the same way as in FIGS. 1 and 2. For this purpose there are again provided five pins, in a manner not shown. The magnetic head unit 17 comprises a magnetic head 18 which on both sides of a head face 19 has a slightly adapted head profile, so that space is obtained for two tape guides comprising cylindrical posts 20 and 21 whose axes extend parallel to the cylinder axis of the head face 19. At the top the post 20 adjoins a guide element and height limiter 22, which may be rigidly connected thereto. At the top the post 21 has an internal screw-thread which provides axial adjustment of the guide element and height limiter 23. The height limiter 22 on the cylindrical body 20 in principle defines the track position during recording of a magnetic tape. By means of the screw-thread the height limiter 23 is adjusted in such a way that again a connecting line between the limit surfaces of the two height limiters 22 and 23 is perfectly perpendicular to a head face 24. This construction again provides a perpendicular azimuth position. Furthermore, the present construction has the advantage that also in the case of conventional techniques, without the use of automatic computer-controlled production machines, a fixed azimuth adjustment can be obtained.

Furthermore, it is to be noted that in this second embodiment it may be advantageous to provide the magnetic head 18 with a reference face, because this enables the connecting line to be adjusted relative to the reference face.

The magnetic head unit 25 in a third embodiment of an apparatus in accordance with the invention as shown in FIGS. 4 and 5 comprises a magnetic head 26 arranged in an extruded casing, which casing comprises lateral members 28 and 29 arranged on opposite sides of a head face 27 of the magnetic head 26.

End portions 30 and 31 respectively of the lateral members, which end portions adjoin the head face 27, again take the form of cylindrical bodies and project from the adjacent parts of the head face 27, in the same way as in the previous embodiments, in order to obtain contact with the magnetic tape over some length (FIG. 5). In a direction transverse to the direction of transport of the magnetic tape the lateral members 28 and 29 have a height which is smaller than the height of the front surface of the magnetic head which comprises the head face 27. Thus, above and below the lateral members 28 and 29 space is available for accommodating further elements which are relevant to the invention. For example, a spring-steel plate 32 is secured to the upper surface of the magnetic head 26, for example, by gluing or welding, which plate is at least substantially U-shaped in the plan view shown in FIG. 5, the two limbs 33 and 34 of the plate 32 forming flat springs which extend from that side of the magnetic head 26 which is remote from the head face 27 up to the tape guides formed by the end portions 30 and 31. In order to obtain a suitable spring force for the springs the upper sides of the portions 30 and 31 serve as abutments for the springs 33 and 34. Thus, when lifted the springs 33 and 34 provide a force which is suitably 2 to 5 grams. In the plan view shown in FIG. 5 the flat springs 33 and 34 are provided with bent end portions 35 and 36 above the cylindrical bodies in order to obtain the correct pressure, which end portions contact the tape at the location where the magnetic tape is in contact with the end portions 30 and 31. The end portions of the spring 33 and 34 form the control means for constantly keeping the lateral edge of the magnetic tape which is moved along the magnetic head unit in contact with the associated height limiters 37 and 38 respectively. In this respect it is of importance that the axial dimensions of the end portions 30 and 31 (designated by the reference numeral 100 in FIG. 4) are such that the springs 33 and 34 constantly exert pressure on the tape edge. The height limiters and tape guide elements 37 and 38 form part of supporting plates 39 and 40, which are secured to the lateral surfaces of the lateral members 28 and 29. In the same way as in the preceding embodiments the supporting plate 39 with the height limiter 37 is first secured to the magnetic head. The height limiter 37 determines the track position on the magnetic tape. The second height limiter 38 is secured to the magnetic head 26 with the supporting plate 40 in such a way that again a connecting line between the limit surfaces of the two height limiters 36 and 38 extends perpendicularly to a plane through the head gap 41. It has been found that an accuracy of 90° plus or minus 10" is attainable. For this use may be made of a manipulator, the supporting plate 40, for example, being spot-welded to the magnetic head after the correct position has been obtained. The plate may also be secured by means of screws. It is alternatively possible to form a reference face in the magnetic head by means of computer control, so that the height limiters 37 and 38 are automatically arranged in such an accurate manner that no further adjustment is required.

In the present embodiment the cylindrical bodies 30 and 31 are again integral with the part of the magnetic head 26 which comprises the head face. The axial height of the cylindrical bodies, as already stated, is smaller than the height of the front surface of the head 26. Suitably, this axial dimension, measured between the limit surfaces of the height limiters 37 and 38 respectively and the end portions 35 and 36 respectively of the spring 33 or 34, respectively is at the most equal to the minimum width dimension of the magnetic tape. For a correct contact with the tape the cylindrical bodies 30 and 31 are preferably formed by means of a grinding operation, all the generatrices of the head face 27 and the cylindrical bodies extending accurately parallel to each other. As a result of the shape of the lateral members 28 and 29, above which the springs 33 and 34 and underneath which the height limiters 37 and 38 are disposed, a magnetic head unit construction is obtained which at the location of the lateral members has an overall height which at the most equals the height of the front surface of the magnetic head. As a result of this, the magnetic head unit in accordance with the invention is readily suitable for use in conjunction with a standard compact cassette. In the present embodiment the height limiters are arranged at the underside. Since the tracks on a compact-cassette tape are situated near the lower edge of the tape it is an advantage of this construction that an accurate track position can be obtained. It is to be noted that it is possible to arrange the head unit in accordance with the invention on a mounting plate 42 which can be secured to the head plate 1 by means of screws 43 and, if required, spacers, without the necessity of any further adjustment. This rather coarse method of fixation suffices, because the azimuth position is entirely defined by the magnetic head unit 26. An advantage of the construction in accordance with the invention is, moreover, that in the present embodiment all provisions for obtaining the correct azimuth position are incorporated in the head unit itself. This enables head units on existing equipment to be replaced by a head unit in accordance with the invention.

FIG. 5 shows the position of the tape guides 44 which form part of a compact-cassette housing. In the operating position these tape guides are disposed on opposite sides of the head unit. The construction of the head unit in accordance with the invention eliminates or mitigates the adverse effect of these tape guides on the tape transport.

Figures 6, 7, 8:
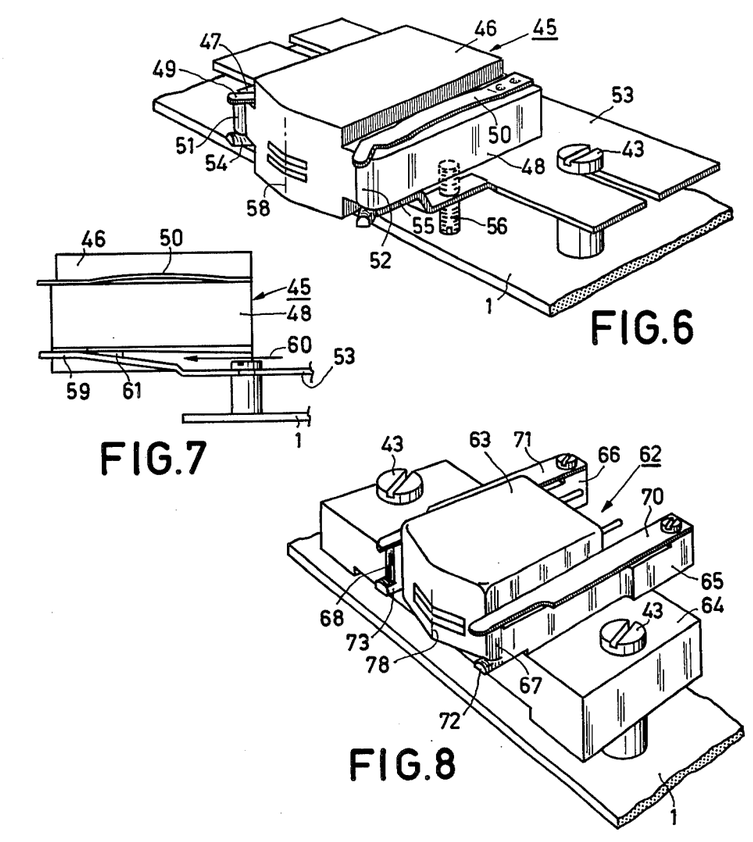
FIG. 6 shows a part of a fourth embodiment of an apparatus in accordance with the invention.
FIG. 7 shows a part of a fifth embodiment of an apparatus in accordance with the invention, which is a variant of the embodiment shown in FIG. 6.
FIG. 8 shows a part of a sixth embodiment of an apparatus in accordance with the invention.

The fourth embodiment of a magnetic head unit 45 as shown in FIG. 6 comprises a magnetic head 46 accommodated in an extruded casing. In the same way as in the preceding embodiment the magnetic head 46 has lateral members 47 and 48 having a height which is smaller than that of the front surface of the magnetic head 46 which includes the head face. On the upper surface of the respective lateral member 47 or 48 a flat spring 49 or 50 respectively is arranged, which spring is connected to the lateral member at the side of the magnetic head which is remote from the head face. Essentially, the shape of the free end of each spring 49 or 50 corresponds to that in the preceding embodiment. The same applies to the shape of the cylindrical bodies 51 and 52 comprising the end portions of the lateral members 47 and 48. The principal difference with the preceding embodiment is the construction of the height limiters underneath the cylindrical bodies 51 and 52. These limiters form part of a mounting plate 53 of the magnetic head 46. A lug 54 of the mounting plate 53 is situated underneath the cylindrical body 51, the lug 54 preferably extending slightly upward from the major part of the mounting plate 53, so that the end portion of the lug 54 is positioned against the underside of the lateral member 47. The lug 54 constitutes a guide element or height limiter whose upper or limit surface defines the track position on the magnetic tape. The mounting plate 53 further comprises a cut-out lug 55, which also extends upward from the major part of the plate 53 towards the cylindrical body 52, the lug 55 being cut out of the mounting plate 53 in such a way that it is pivotable relative to the major part of the mounting plate. A set-screw 56 extends through the lug 55, one end of the screw bearing against the underside of the lateral member 48. In this way the free end of the lug 55, which forms a height limiter or guide element, is adjustable by screws in the height direction. This adjustment is effected, as already described, in a manipulator measuring arrangement, the screw 56 being turned until the connecting line between the two limit surfaces is purely perpendicular to a plane through the head gap 58. The resulting air gap between the underside of the lateral member 48 and the lug 55 may be filled with glue for locking purposes, in order to ensure that the correct setting is maintained. It is alternatively possible to lock the screw 56 itself.

Instead of the screw for adjusting the height limiter 55 as shown in FIG. 6, it is possible, as is shown in FIG. 7, to use a key or wedge which is inserted in the gap between the underside of the lateral member 48 and the upper side of a lug 59, which constitutes the height limiter, as indicated by the arrow 60. By means of a manipulator, for example a wedge 61 is pushed in the direction of the arrow 60 until the connecting line between the limit surfaces of the two height limiters 54 and 55 is again perpendicular to a plane through the head gap 58. Subsequently, the head gap between the lug and the lateral member may be filled with glue for locking purposes. For an accurate adjustment it is of advantage that the lug 59 slopes gradually upward from the mounting plate 53.

Figure 9:
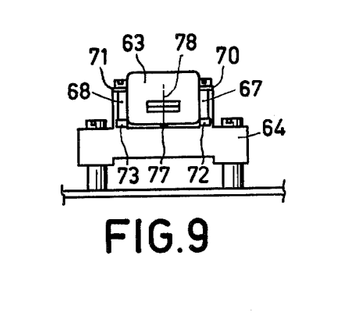
FIG. 9 is a different view of the part of the apparatus shown in FIG. 8.
Figure 10:
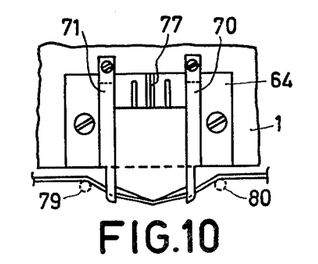
FIG. 10 is a plan view of the part of the apparatus shown in FIG. 8.
Figure 11:
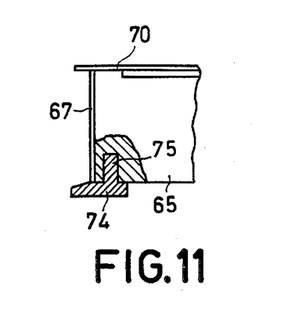
FIG. 11 shows a part of a seventh embodiment of an apparatus in accordance with the invention, which is a variant of the embodiment shown in FIG. 8.
Figure 12:
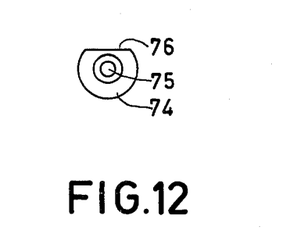
FIG. 12 is a different view of a height limiter used in the apparatus shown in FIG. 11.

The magnetic head unit 62 shown in FIGS. 8, 9 and 10 employs a normal commercially available magnetic head 63. In addition the magnetic head unit 62 comprises a mounting plate 64, which are integral with the lateral members 65 and 66. The members 65 and 66 again have a height which is smaller than that of the front surface of the magnetic head 63 which comprises the head face. End portions of the lateral members 65 and 66 form cylindrical bodies 67 and 68 respectively. The members 65 and 66 together with the mounting plate 64 may be manufactured from a suitable material such as a plastic. When selecting the material it is important that this material has a satisfactory dimensional stability, so that the cylindrical bodies 67 and 68 retain the correct shape during use. In the present embodiment flat springs 70 and 71 are arranged on the upper sides of the lateral members 65 and 66 for exerting a comparatively small pressure on the upper edge of the magnetic tape, so that these control means ensure that the lower edge of the magnetic tape is constantly in contact with the height limiters 72 and 73 during transport. The height limiters 72 and 73 may form part of the lateral members 65 and 66. Alternatively, as is shown in FIGS. 11 and 12, the height limiters may comprise hardened metal blocks 74, which each comprise a pin 75 which is clamped in an opening in the underside of the lateral member. Said blocks may for example be of a material such as tungsten carbide. It is also possible to use a wear-resistant material such as chromium steel or a ceramic material. Suitably, the block is slightly conical on its upper side and is centered relative to the axis of the pin 75. In the embodiment shown in FIG. 11 the portion of the height limiter constituting a tape guide element has been turned off over approximately 5°. Each block comprises a flattened side 76, enabling the magnetic head unit to be readily inserted into a compact cassette. The mounting plate 64 comprises a knife-edge bearing 77, which is situated directly underneath the head gap 78 of the magnetic head. After the magnetic head 73 has been mounted onto the mounting plate 64 between the lateral members 65 and 66 a slight clearance exists for pivoting the magnetic head about an axis which is determined by pivoting the upper edge of the knife-edge bearing 77 perpendicularly to the direction of transport of the magnetic tape. In this way a connecting line between the limit surfaces of the height limiters 72 and 73 can be adjusted so that it is accurately perpendicular to a plane through the head gap 78. After the magnetic head has been pivoted into the correct position by means of a manipulator, the magnetic head may also be glued in position in the present embodiment. In the present embodiment it is also possible to adjust the connecting line between the limit surfaces so as to extend perpendicularly to a plane through the head gap 78 with an accuracy within 10". As is illustrated by FIG. 10 the construction of the magnetic head unit in accordance with the invention is of special advantage in order to eliminate the influence of the tape guides 79 and 80 in the cassette housing on the tape transport. The construction of the magnetic head unit in accordance with the invention eliminates or mitigates this undesired influence in that the head unit corrects the tape movement after a tape guide in such a way that a correct azimuth position is obtained at the location of the head gap 78.

Figure 13:
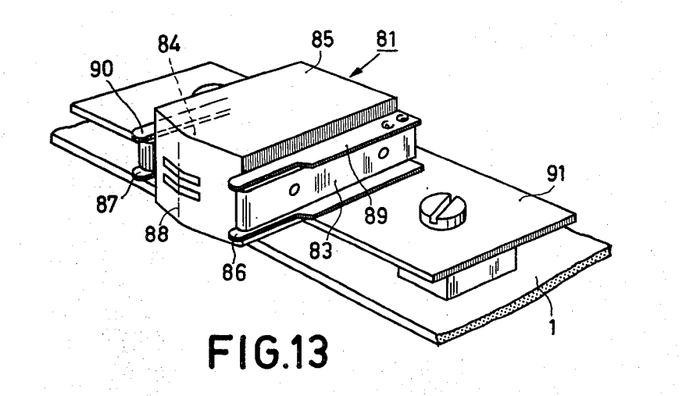
FIG. 13 shows a part of an eighth embodiment of an apparatus in accordance with the invention.

FIG. 13 shows a magnetic head unit 81, in which two separate lateral members 83 and 84 of a strip material are secured to the side walls of a normal commercially available magnetic head. The front end of the strip material has been rounded in order to form the cylindrical bodies. By means of a technique to be described hereinafter the lateral members are connected to a magnetic head 85 in such a way that again a connecting line between the limit surfaces of the height limiters 86 and 87 extends perfectly perpendicularly to a plane through the head gap 88. The lateral members 83 and 83 again have such a height in comparison with the overall height of the front surface of the magnetic head 85 which includes the head face that a clearance of approximately 2 mm is left at the top and bottom. FIG. 13 shows how in an alternative embodiment height limiters 86 and 87 of a flat-spring material are formed underneath the lateral members. By securing these springs to the associated lateral members near the rear and front ends of the height limiters will be substantially more rigid than the leaf springs 89 and 90 arranged on the upper sides of the lateral members 83 and 84. In this way these height limiters behave as substantially rigid parts relative to the magnetic tape. The lateral members are lightly urged against the side walls of the magnetic head during adjustment, their lower edges being kept at the same level so that they move parallel to each other during adjustment. For the purpose of adjustment the magnetic head 85 is arranged on an alignment jig provided with a knife-edge bearing for accuratly tilting the head, and with supports which keep the lateral members 83 and 84 at the correct level during adjustment of the head. When the adjustment is correct the lateral members are secured to the magnetic head, for example by welding. After adjustment and fixation the magnetic head 85 is secured to a mounting plate 91. A further advantage of this embodiment is the possibility of using comparatively cheap components.

It is to be noted that the magnetic head units in the preceding embodiments may lead to a universal improvement of a magnetic-tape cassette system. This makes it possible to continue existing cassette systems, such as the so-called compact cassette and microcassette, as a result of which the construction in accordance with the invention may eliminate the necessity of developing new cassette systems. The proposed magnetic-head units may, moreover, provide an improvement for the recording of signals in a tape transport mode opposite to the normal direction of transport, the so-called auto reverse system, in which the direction of transport of the magnetic tape is automatically reversed when the end is reached. In both directions of transport it is ensured that the azimuth position of the magnetic head relative to the magnetic tape is accurately perpendicular. The construction of a magnetic head unit in accordance with the invention furthermore has the advantage that it provides an accurate height stability of the tape transport within a cassette provided with a tape-guide, such as the compact cassette. Thus, the construction in accordance with the invention may be used in order to adapt the well-known compact cassette for digital recording purposes, when very narrow track widths are used.

It is to be noted that the invention is not only advantageous for the construction of the magnetic-tape cassette apparatus itself but also for a suitable construction of the magnetic head units described which, as a result of their inherently accurate azimuth position, may be used for service purposes.

Futhermore, it is to be noted that it is also possible to combine different details of the various embodiments. For example, the plate 32 shown in FIG. 4 may be replaced by the flat springs 49 and 50 in FIG. 6.

FIGS. 14 to 19 represent a number of measurements results in order to illustrate the advantages of the accurate tape transport obtained by a magnetic head unit in accordance with the invention. Except for FIG. 19 all the graphs show the azimuth error (A) plotted as a function of time (T).

Figure 14A:
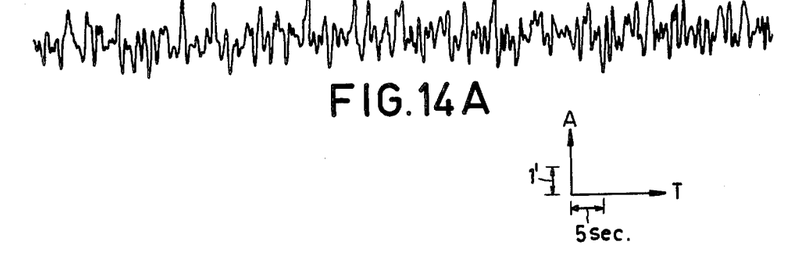
FIGS. 14–19 represent the results of measurements to the tape transport in apparatuses with and without a magnetic head unit in accordance with the invention.
Figure 14B:
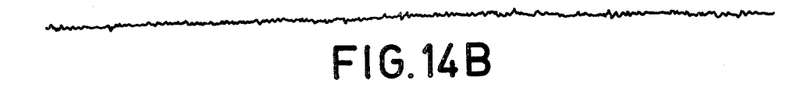

FIG. 14 represents the azimuth-error tolerances, FIG. 14a relating to a standard 10 kHz azimuth test cassette with an accurately constructed housing (metal frame and tape guides), containing a ferro magnetic-tape. This magnetic tape has been recorded on a standard high-quality magnetic-tape apparatus, outside the cassette, which test tape will be referred to hereinafter as the "standard test tape". FIG. 14a shows that despite the accurate tape guidance during recording outside the cassette, the azimuth-error tolerances may increase to +/−0.5' when the cassette is played back on a hifi magnetic-tape cassette apparatus provided with a magnetic head unit in accordance with the invention, which tolerances (as will appear from the following measurements) are too large for precision measurements. Therefore, a special azimuth test cassette has been made with a magnetic tape recorded on a high-quality magnetic-tape apparatus, the recording apparatus being provided with a magnetic head unit in accordance with the invention, which magnetic tape will be referred to hereinafter as "special magnetic tape". FIG. 14b shows that now during playback of the special azimuth test cassette on a hifi cassette apparatus provided with a magnetic head unit in accordance with the invention the azimuth errors are maximum +/−0.1'. This demonstrates that by means of a magnetic-tape apparatus incorporating a head unit in accordance with the invention azimuth test cassettes can be made with an accuracy which is a factor 5 higher than the usual test cassettes.

Figure 15A:
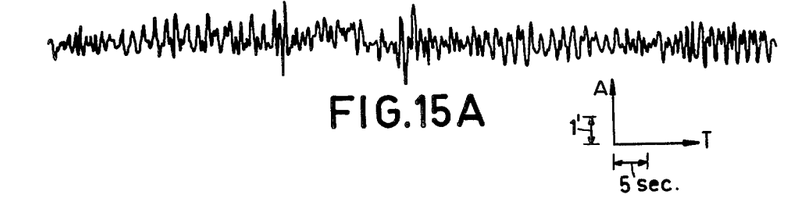
Figure 15B:
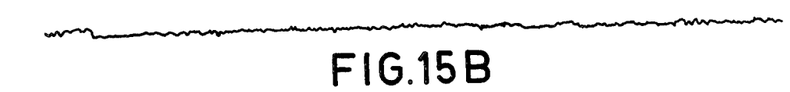

FIG. 15 represents a comparison of results between a normal commercially available hifi magnetic tape cassette apparatus (FIG. 15a) and the same cassette apparatus but now equipped with a magnetic head unit in accordance with the invention (FIG. 15b) using the aforementioned special azimuth test cassette. The maximum tolerance in FIG. 15a is approximately +/−0.5' and in FIG. 15b +/−0.1'. Again this demonstrates that azimuth errors are reduced by a factor 5.

Figure 16A:
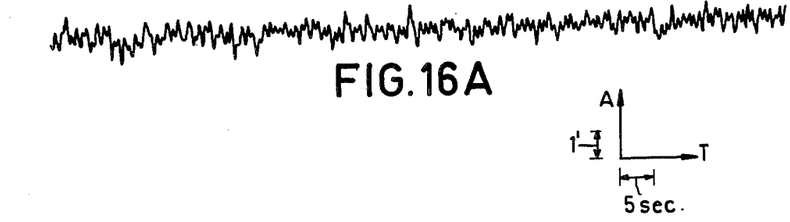
Figure 16B:
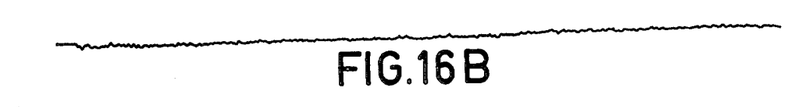

FIG. 16 shows a comparison of results starting from a normal ferro C60 cassette, on which a 10 kHz signal has been recorded by means of a commercially available hifi magnetic-tape cassette apparatus (FIG. 16a) and by means of a similar apparatus using a head unit in accordance with the invention (FIG. 16b). Again it is found that an improvement of the azimuth errors by approximately a factor 5 is obtained. This comparison demonstrates that in the case of recordings made on a normal hifi magnetic tape cassette apparatus equipped with a head unit in accordance with the invention the azimuth tolerances may be reduced by approximately a factor 5.

Figure 17:
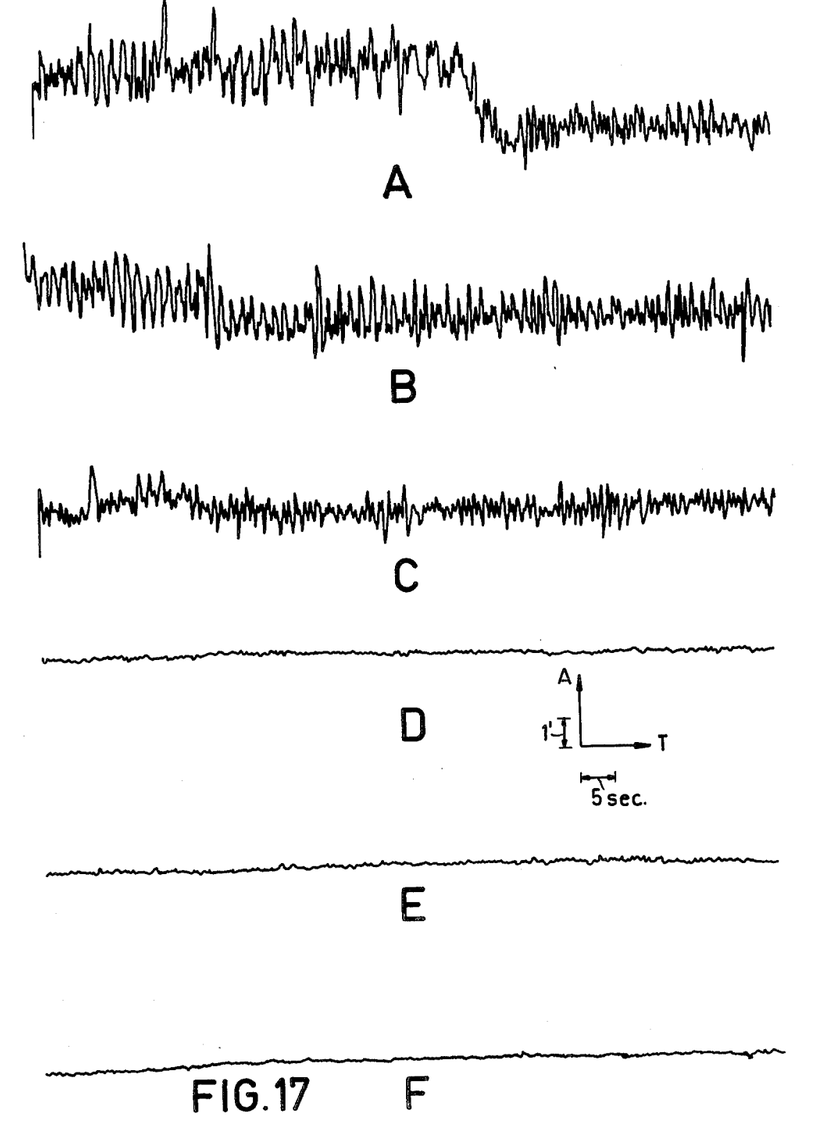

FIG. 17 shows a comparison of the results measured by means of the aforementioned special magnetic tape, which is now accommodated in the housing of three comparatively cheap, commercially available plastic cassettes having tape guides which exhibit the usual tolerances. Such housing are made by injection-molding techniques in quantities of millions a year. FIGS. 17d, e and f show that in a hifi cassette apparatus equipped with a magnetic head unit in accordance with the invention, when the housing corresponding to FIGS. 17a, b and c is used, the azimuth errors are limited to +/−0.3'. FIGS. 17a, b and c show that in a hifi cassette apparatus without the special magnetic head unit the tolerances vary from +/−4' (FIG. 15d) to +/−1.5' FIG.15f). The conclusion to be drawn is that when the head unit in accordance with the invention is used errors in the tape guidance of the cassette housing can be eliminated almost completely. This demonstrates that when magnetic tapes which have been modulated outside the cassette housing, as is frequently done for so-called music cassettes, are played back a substantial improvement in playback quality can be obtained by means of the magnetic head units in accordance with the invention.

Figure 18:
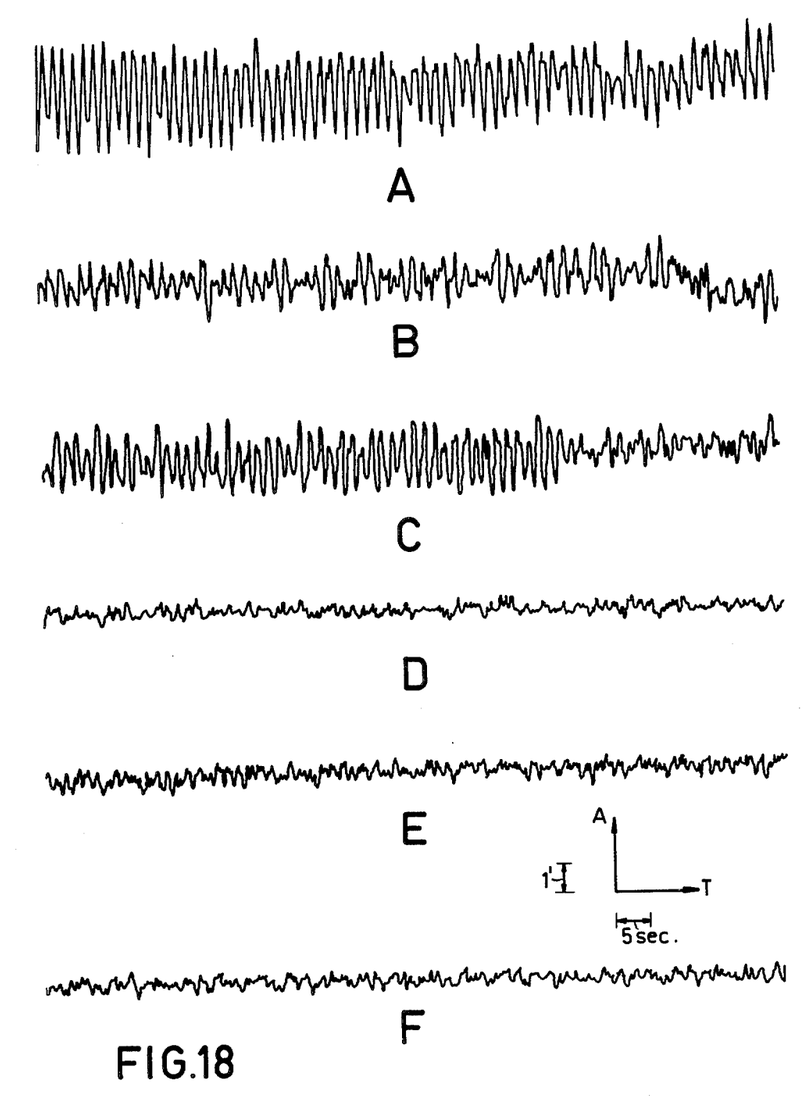

FIG. 18 shows the variation of the azimuth tolerances between the beginning and end of the magnetic tape when using the normal test tape. During transport from the beginning to the end of the magnetic tape variations in tape tension occur, which variations are mainly the result of the changing tape-roll diameter. Between the beginning and the end the tape tension may vary by approximately a factor $2\frac{1}{2}$. For the measurements a standard test-cassette housing is used, one of the windings hubs having an eccentric shape with a radius of minimum 10 mm and maximum 25 mm relative to the axis of rotation. Thus, during one revolution of the eccentric winding hub the same tape-tension variations occur as in a normal cassette between the beginning and the end of the magnetic tape. FIGS. 18a, b and c show; that when three such cassettes are used on a normal hifi cassette apparatus, starting from initial zero positions, tolerances of +/−2' may occur. FIGS. 18d, e and f show that when the cassettes of FIGS. 18a, b and c respectively are used on a hifi cassette apparatus equipped with a magnetic head unit in accordance with the invention azimuth tolerances of +/−0.5' occur, which is a result which may be compared with that of the measurement in accordance with FIG. 14b. Consequently, when the construction in accordance with the invention is used variations in tape tension have hardly any or no effect and the azimuth tolerances do not vary between the beginning and the end.

Figure 19:
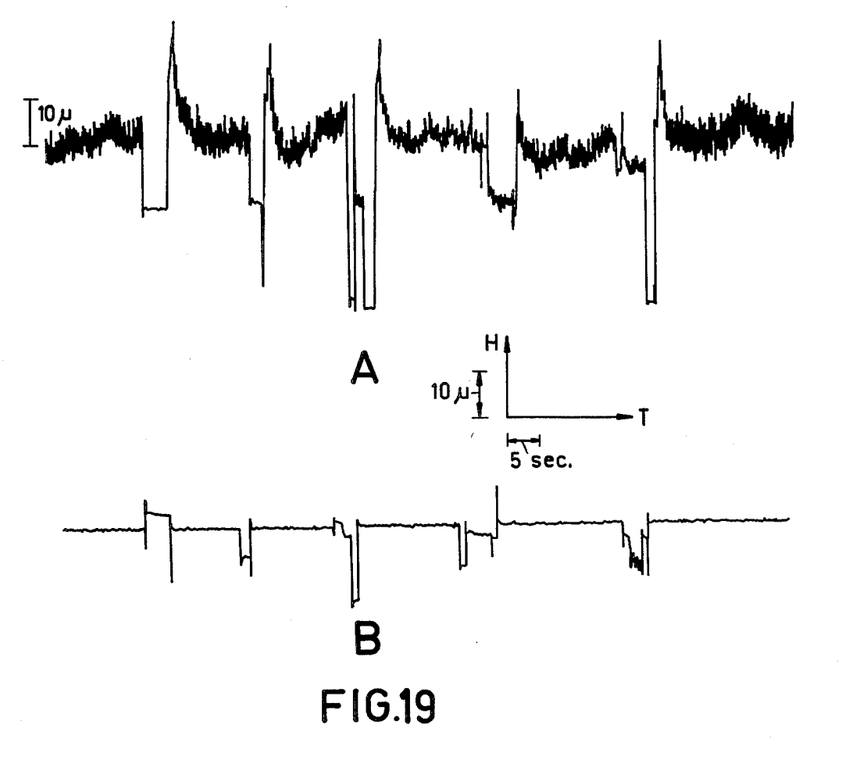

FIG. 19 represents the results of measurements of the height stability of the magnetic tape. In general, when a magnetic tape runs along a magnetic head via guides which deviate for example 1' relative to the horizontal, for example because a first guide occupies a position which is $3\frac{1}{2}$ micrometer higher than a second guide, the tape edge has a height position which is accurate within 2 micrometers near the head gap. The measurements represented by FIG. 19 have been carried out by means of a measuring instrument comprising a photodiode and a phototransistor in order to sense the lower tape edge. Use has been made of a C60 cassette with chromium-dioxide tape. The tests have been carried out on a hifi cassette recorder whose magnetic head has been replaced by this measuring instrument, on which measuring instrument the tape-guide construction of the magnetic head unit in accordance with the invention is used or not used respectively. This means that the tape guides, the height limiters and the control means for keeping the tape edge in contact with the height limiters are arranged on the measuring instrument. The graphs in FIG. 19 show the height deviation (H) plotted as a function of time (T). FIG. 19a shows that in the case of a normal hifi cassette apparatus without the tape guide construction in accordance with the invention height deviations up to 20 micrometers occur, because comparatively large variations in height occur in the case of tape-transport interruptions such as for example in the case of stop-start. The last-mentioned effect may be explained by the fact that each time during starting (playback) the tape requires some time to reach the correct height. FIG. 19b shows that in a hifi cassette apparatus with the tape guide construction in accordance with the invention the maximum height deviations are 1 micrometer, that is an improvement by a factor 10. FIG. 19b represents the situation with the same tape-transport interruptions as in FIG. 19a. This demonstrates that after the interruptions the lace-up is restored to the correct position at a substantially faster rate.

The conclusion from FIG. 19 is that the head unit in accordance with the invention is particularly suitable for digital recordings, for which the track position in the height direction should be maintained very accurately. As a result of this very narrow tracks may be selected, the number of tracks on the tape may be increased and consequently, the tape speed may be reduced.

I claim:

1. A magnetic-tape apparatus, comprising
   a magnetic head unit including a magnetic head having a head face which is generally cylindrical about an axis and has a radius of curvature, and having a head gap terminating in said face and defining a head gap plane through the head gap, which plane is perpendicular to a plane tangential to the head face at the gap; and also including two height limiter elements disposed one on each side of the head gap; and
   means for passing a magnetic tape along said face in a direction of transport generally perpendicular to the head gap plane and arranged such that the height limiter elements are on opposite sides of the gap in the direction of transport of the tape, each height limiter having a limit surface arranged to limit movement of said tape in at least one direction transverse to the direction of transport of the tape and parallel to said plane tangential to the head face,
   characterized in that the head unit further includes two tape guides, disposed one to each side of the gap in said direction of transport, each guide having a guide surface having a radius of curvature arranged to maintain the tape lateral edges taut at the location of the guide surface, and an end, and each guide being arranged such that tape being passed along the head face contacts each guide; and the apparatus comprises control means for keeping a lateral edge of the tape constantly in contact with said limit surfaces during tape transport, each height limiter element being disposed adjoining an end of a respective tape guide, the limit surfaces adjoining the respective guide surfaces at points on a connecting line which extends perpendicular to said head gap plane.

2. An apparatus as claimed in claim 1, characterized in that the tape guides comprise at least partly cylindrical bodies disposed near the head face, said bodies having cylinder axes parallel to the head face axis, said bodies projecting beyond adjacent portions of the head face.

3. An apparatus as claimed in claim 2, characterized in that said bodies are integral with a portion of the magnetic head comprising the head face, and have a ground cylindrical surface having a radius of curvature less than the radius of the head face, positioned accurately relative to a reference face of the magnetic head.

4. An apparatus as claimed in claim 3, characterized in at least one of said height limiters is formed by an adjustable guide element, which is axially adjustable relative to the associated cylindrical body.

5. An apparatus as claimed in claim 2, characterized in that said tape guide surfaces have a radius of curvature less than the radius of the head face; and at least one of said height limiters is formed by an adjustable guide element, which is axially adjustable relative to the associated cylindrical body.

6. An apparatus as claimed in any one of claims 1–5, characterized in that the magnetic head unit includes a plate-shaped body arranged on a major surface of the magnetic head, which surface extends substantially parallel to the direction of tape transport; and said height limiters comprise projecting lugs formed in said plate-shaped body.

7. An apparatus as claimed in claim 6, characterized in that the plate-shaped body comprises a mounting plate by which the magnetic head is mounted.

8. An apparatus as claimed in claim 5, characterized in that the magnetic head unit includes a plate-shaped body comprising a mounting plate on which the magnetic head is mounted, arranged on a major surface of the magnetic head, which surface extends substantially parallel to the direction of tape transport; said guide element is formed as the end portion of a lug cut out of the mounting plate, said lug being pivotable relative to the remainder of the mounting plate or axial adjustment; and said height limiters comprise projecting lugs formed is said plate-shaped body.

9. An apparatus as claimed in claim 8, characterized in that the magnetic head unit has a side facing the remainder of the apparatus, and comprises a plurality of pins arranged at that side for plugging the head unit into the apparatus and providing electrical connection to the apparatus.

10. An apparatus as claimed in claim 5, characterized in that the magnetic head unit has a side facing the remainder of the apparatus, and comprises a plurality of pins arranged at that side for plugging the head unit into the apparatus and providing electrical connection to the apparatus.

11. An apparatus as claimed in claim 1, characterized in that the magnetic head unit has a side facing the remainder of the apparatus, and comprises a plurality of pins arranged at that side for plugging the head unit into the apparatus and providing electrical connection to the apparatus.

12. An apparatus as claimed in claim 11, characterized in that said control means comprises two flat springs, each disposed at an end of a respective tape guide remote from the respective limit surface and arranged to act resiliently on the axial end of the tape guide; and each tape guide has an axial dimension, measured between the respective limit surface and the flat spring, at most equal to the minimum width dimension of the magnetic tape.

13. An apparatus as claimed in claim 5, characterized in that said control means comprises two flat springs, each disposed at an end of a respective tape guide remote from the respective limit surface and arranged to act resiliently on the axial end of the tape guide; and each tape guide has an axial dimension, measured between the respective limit surface and the flat spring, at most equal to the minimum width dimension of the magnetic tape.

14. An apparatus as claimed in claim 1, characterized in that said control means comprises two flat springs, each disposed at an end of a respective tape guide remote from the respective limit surface and arranged to act resiliently on the axial end of the tape guide; and each tape guide has an axial dimension, measured between the respective limit surface and the flat spring, at most equal to the minimum width dimension of the magnetic tape.

15. A magnetic head unit for use with a tape apparatus having means for transporting a magnetic tape in a given direction of transport along a face of a magnetic head, comprising
a magnetic head having a head face which is generally cylindrical about an axis and has a radius of curvature, and a head gap terminating in said face and defining a head gap plane through the head gap, which is perpendicular to a plane tangential to the head face at the gap;
two height limiter elements disposed one on each side of the head gap, arranged such that the height limiter elements are on opposite sides of the gap in the direction of transport of the tape, each height limiter having a limit surface arranged to limit movement of said tape in at least one direction transverse to the direction of transport of the tape and parallel to said plane tangential to the head face,
characterized in that the head unit further includes
two tape guides, disposed one to each side of the gap in said direction of transport, each guide having a guide surface having a radius of curvature arranged to maintain the tape lateral edges taut at the location of the guide surface, and an end; and each guide being arranged such that tape being passed along the head face contacts each guide, and
control means for keeping a lateral edge of the tape constantly in contact with said limiter surfaces during tape transport, each height limiter element being disposed adjoining an end of a respective tape guide, the limit surfaces adjoining the respective guide surfaces at points on a connecting line which extends perpendicular to said head gap plane.

16. A unit as claimed in claim 15, characterized in that the tape guides comprise at least partly cylindrical bodies formed integrally with the part of the magnetic head comprising the head face, said bodies projecting from the adjacent parts of the head face and having cylinder axes parallel to the head face axis and ground surfaces having a radius of curvature less than the radius of the head face for guiding the tape, positioned accurately relative to a reference face of the magnetic head.

17. A unit as claimed in claim 16, characterized in that at least one of said height limiters is formed as a guide element axially adjustable relative to a respective associated cylindrical body.

18. A unit as claimed in claim 15, characterized in that the magnetic head has a major surface extending substantially parallel to the direction of tape transport; the unit comprises a mounting plate arranged on said major surface, by which the magnetic head is mounted; and said mounting plate has projecting lugs which serve as said height limiters.

19. A unit as claimed in claim 1, characterized in that said guide surfaces have a radius of curvature less than the radius of curvature of the head face.

20. A unit as claimed in any one of claims 15, 16, 17, 18, or 19 characterized in that said control means comprises two flat springs, each disposed at an end of a respective tape guide remote from the respective limit surface and arranged to act resiliently on the axial end of the tape guide; and each tape guide has an axial dimension, measured between the respective limit surface and the flat spring, at most equal to the minimum width dimension of the magnetic tape.

21. A unit as claimed in claim 19, characterized in that said flat springs are connected to the magnetic head unit near a side of the magnetic head remote from the head face.

22. A unit as claimed in claim 20, characterized by comprising at least two lateral members disposed on opposite sides of the head face in the direction of transport of the magnetic tape, end portions of said members forming the tape guide surfaces; said flat springs extend along upper surfaces of the lateral members and the height limiters are disposed under said lateral members such that the overall height between the upper surfaces of the flat springs to the limit surface is at most equal to the height of the front surface of the magnetic head.

23. A unit as claimed in claim 19, characterized by comprising at least two lateral members disposed on opposite sides of the head face in the direction of transport of the magnetic tape, end portions of said members forming the tape guide surfaces; said flat springs extend along upper surfaces of the lateral members and the height limiters are disposed under said lateral members such that the overall height between the upper surfaces of the flat springs to the limit surface is at most equal to the height of the front surface of the magnetic head.

24. A unit as claimed in claim 22, characterized in that said height limiters comprise hardened metal blocks disposed against the underside of the lateral members.

25. A unit as claimed in claim 23, characterized by comprising means for pivoting the magnetic head about an axis perpendicular to the direction of transport of the magnetic tape, said means for pivoting including a knife-edge bearing arranged on the mounting plate between the lateral members.

26. A unit as claimed in claim 22, characterized by comprising means for pivoting the magnetic head about an axis perpendicular to the direction of transport of the magnetic tape, said means for pivoting including a knife-edge bearing arranged on the mounting plate between the lateral members.

* * * * *

UNITED STATES PATENT AND TRADEMARK OFFICE
CERTIFICATE OF CORRECTION

PATENT NO. : 4,485,420
DATED : November 27, 1984
INVENTOR(S) : J.J. M. SCHOENMAKERS It is certified that error appears in the above-identified patent and that said Letters Patent is hereby corrected as shown below:

Claim 8, line 9, "or" should be --for--;

line 11, "is" should be --in--

Claim 19, line 1, "1" should be --26--.

Signed and Sealed this

Eighteenth Day of June 1985

[SEAL]

Attest:

DONALD J. QUIGG

Attesting Officer    Acting Commissioner of Patents and Trademarks